(12) United States Patent
Cohn et al.

(10) Patent No.: US 6,825,711 B2
(45) Date of Patent: Nov. 30, 2004

(54) POWER REDUCTION BY STAGE IN INTEGRATED CIRCUIT

(75) Inventors: John M. Cohn, Richmond, VT (US); Kenneth J. Goodnow, Essex Junction, VT (US); Scott W. Gould, South Burlington, VT (US); Douglas W. Stout, Milton, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/249,684

(22) Filed: Apr. 30, 2003

(65) Prior Publication Data

US 2004/0217805 A1 Nov. 4, 2004

(51) Int. Cl.[7] ................................................ G05F 1/10
(52) U.S. Cl. ......................................................... 327/544
(58) Field of Search ................................. 327/530, 534, 327/535, 537, 544, 545, 546

(56) References Cited

U.S. PATENT DOCUMENTS

| | | | | |
|---|---|---|---|---|
| 5,724,297 A | * | 3/1998 | Noda et al. | 365/226 |
| 5,973,552 A | * | 10/1999 | Allan | 327/544 |
| 6,412,096 B1 | | 6/2002 | Ventrone | |
| 6,707,747 B2 | * | 3/2004 | Zitlaw et al. | 365/227 |

OTHER PUBLICATIONS

Burd, Thomas D. and Robert W. Brodersen, "Design Issues for Dynamic Voltage Scaling," ISLPED 2000, Rapallo, Italy, pp. 9–14.
Leibson, Steve, "XScale(StrongARM–2) Muscles In," Microdesign Resources, Sep. 11, 2000, pp. 1–5.
* cited by examiner

*Primary Examiner*—Jeffrey Zweizig
(74) *Attorney, Agent, or Firm*—Richard A. Henkler; Hoffman, Warnick & D'Alessandro LLC

(57) ABSTRACT

An integrated circuit, method and system providing finer granularity dynamic voltage control without performance loss. The invention provides a means for dynamically changing a voltage level of at least one stage on a critical path for a particular cycle. In this way, optimum voltages can be provided to the stages for the given expectation.

17 Claims, 4 Drawing Sheets

POWER REDUCTION BY STAGE IN INTEGRATED CIRCUIT

BACKGROUND OF INVENTION

1. Technical Field

The present invention relates generally to integrated circuits, and more particularly, to power consumption reduction by stage in an integrated circuit.

2. Related Art

The trend towards portable integrated circuit (IC) applications, requires IC designs with increased performance and reduced power consumption. Accordingly, the challenge continues to be to design ICs with reduced power consumption by operating at the minimum performance level required by the active software and/or application.

One current approach to power savings is by providing dynamic voltage control per stage in an IC path, i.e. pipeline. One example of this approach is disclosed in "Design Issues for Dynamic Voltage Scaling," by Burd and Broderson, ISLEP, 2000, Rapallo, Italy. In this example, the clock frequency and supply voltage are varied on demand. In particular, in this example, the operating system is knowledgeable of the current logic functional unit execution performance requirements, and controls the clock frequency by writing to a register in the system control states. A dynamic voltage scaling feedback loop architecture then converts a desired operating frequency into the operating voltage (Vdd). Unfortunately, the above example requires level shifting, which impacts performance.

Another example of this approach is disclosed in "XScale (StrongARM-2) Muscles In," Microdesign Resources, Sep. 11, 2000. In this example, a processor contains performance-monitoring hardware consisting of counters and timers to measure performance-related characteristics such as cache-stall cycles, bus latency, and idle cycles. The operating system or application code can then dynamically adjust processor performance so as to minimize power consumption. For example, the voltage delivered to the processor may be varied via off-chip voltage sources. This approach requires voltage switching off-chip and addresses power reduction only at a full execution-unit level basis.

In view of the foregoing, there is a need in the art a method and system for on-chip voltage control per stage for performance and power optimization at a finer granularity than disclosed in the related art.

SUMMARY OF INVENTION

An integrated circuit, method and system providing finer granularity dynamic voltage control without performance loss. The invention provides a means for dynamically changing a voltage level of each stage on a critical path for a particular cycle. In this way, optimum voltages can be provided to the stages for the given execution for performance and power optimization.

A first aspect of the invention is directed to an integrated circuit comprising: a plurality of paths including a critical path for a particular cycle, the critical path including a plurality of stages; and means, within the integrated circuit, for dynamically changing a voltage level of at least one stage for the particular cycle.

A second aspect of the invention is directed to a method of reducing power consumption of an integrated circuit comprising: transmitting data along one of a plurality of paths based on a particular operation to be executed, each path including a plurality of stages that operate on the data; and changing a voltage level of at least one stage.

A third aspect of the invention is directed to a system for reducing power consumption of an integrated circuit, the system comprising: means, within the integrated circuit, for determining a voltage level required for each stage on a path used for a particular cycle; and means, within the integrated circuit, for changing the voltage level of at least one stage on the path.

The foregoing and other features of the invention will be apparent from the following more particular description of embodiments of the invention.

BRIEF DESCRIPTION OF DRAWINGS

The embodiments of this invention will be described in detail, with reference to the following figures, wherein like designations denote like elements, and wherein.

DETAILED DESCRIPTION

Figure 1:
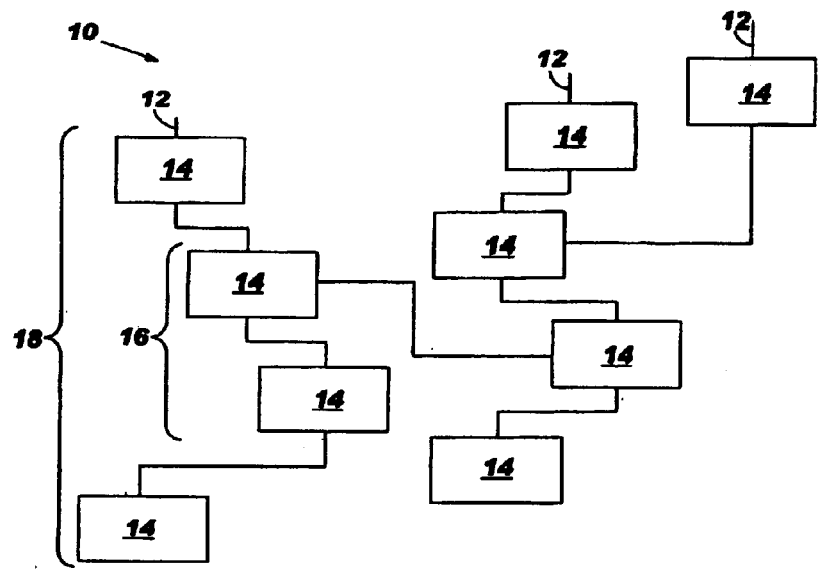
FIG. 1 shows a conceptual view of a portion of an integrated circuit.

With reference to the accompanying drawings, FIG. 1 illustrates a conceptual view of a portion of an integrated circuit (IC) 10 including a plurality of pipelines or paths 12. As shown, each instance of a functional element (or book of logic), such as an "AND" gate, is called a leaf 14 in the functional path; each unique combination of leaves (two books interconnected) is called a twig 16; and, an instance of two or more twigs is called a branch 18. Each path 12 includes a number of leaves 14, twigs 16 and branches 18 as the path passes through IC 10. The number of leaves 14 that exist within a design can be in the millions. A leaf (leaves) 14, twig(s)16 or branch(es) 18 may be grouped according to a common power requirement. Each of these groupings are referred to herein as a "stage." As illustrated, different architecture paths are often long, and share the same functional elements.

Within each IC 10, a path's 12 significance varies from cycle to cycle, i.e., based on a particular operation to be executed during a particular cycle. A path's 12 significance can increase, for example, when it represents a majority of the dataflow through IC 10, is critical to IC operation or has some other characteristic that makes it important to IC operation and/or performance. In one particular example, a path 12 may set a maximum operating frequency and/or maximum operating performance of IC 10. For purposes of description, the most significant path(s) for a particular cycle shall be referred to as a "critical path." Each IC 10 may have a number of critical paths for any given cycle. The invention described herein is applicable to these critical paths, and is not applied to every path 12 on IC 10. It should be recognized also that what functional elements are on "critical paths" may also change between cycles. For instance, a multiplexor may be in a critical path during a special conditional arithmetic logic unit (ALU) operation. The multiplexor may also oftentimes (e.g., for many cycles) be in a simple multiplication path that may be less critical.

Figure 2:
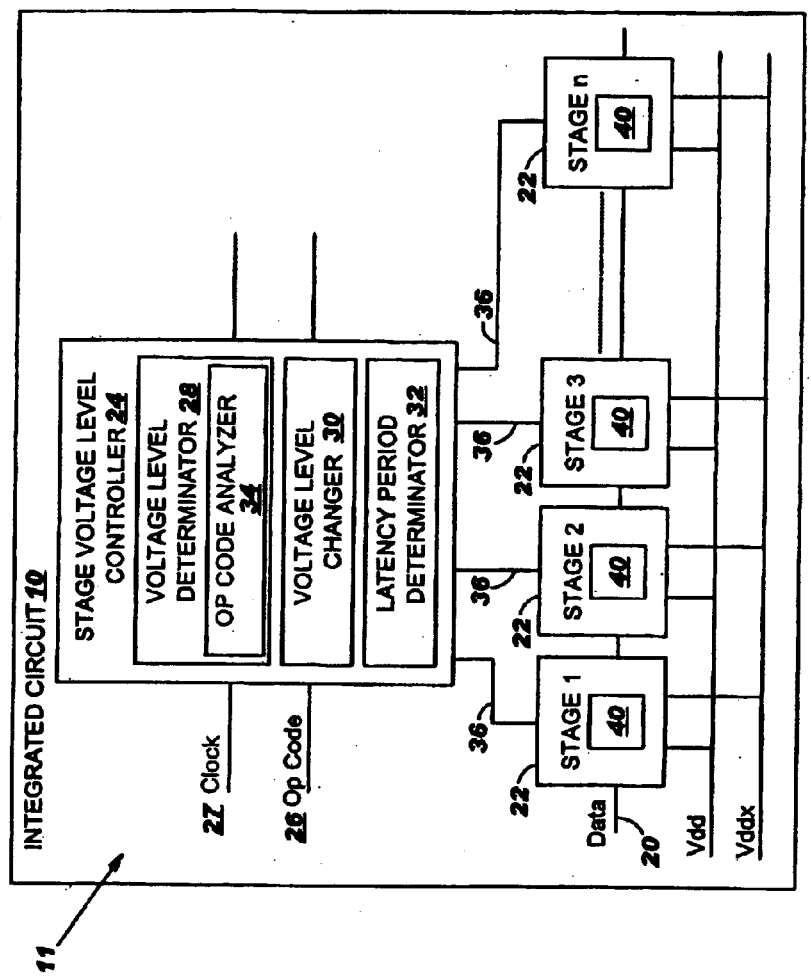
FIG. 2 shows an integrated circuit including dynamic voltage level changing of stages according to a first embodiment.

FIG. 2 illustrates an IC 10 according to a first embodiment. IC 10 includes a critical path 20 having a plurality of stages 22, and a system 11 for reducing power consumption within its framework including a stage voltage level adjuster 24 for dynamically changing a voltage level of each stage 22. As illustrated, critical path 20 may include any number of stages 22 denoted stage 1, stage 2, stage 3 and stage n, where n is an integer. Stage voltage level controller 24 receives operation code ("op code") 26 and clock signal 27. Stage voltage level controller 24 functions to dynamically change a voltage level of each stage 22 to reduce power consumption. Stage voltage level controller 24 includes a voltage level determinator 28, a voltage level changer 30 and a latency period determinator 32. Voltage level determinator 28 includes an op code analyzer 34 for analyzing op code 26 to determine a voltage level required for each stage 22 of a particular cycle's critical path 20. In particular, op code analyzer 34 analyzes code to determine a number of cycles prior to implementation of the particular cycle the type of path operation, and the power consumption requirements for stage(s) within critical path 20. In this way, only the power required to meet the timing operation for the particular cycle is utilized.

Figure 3:
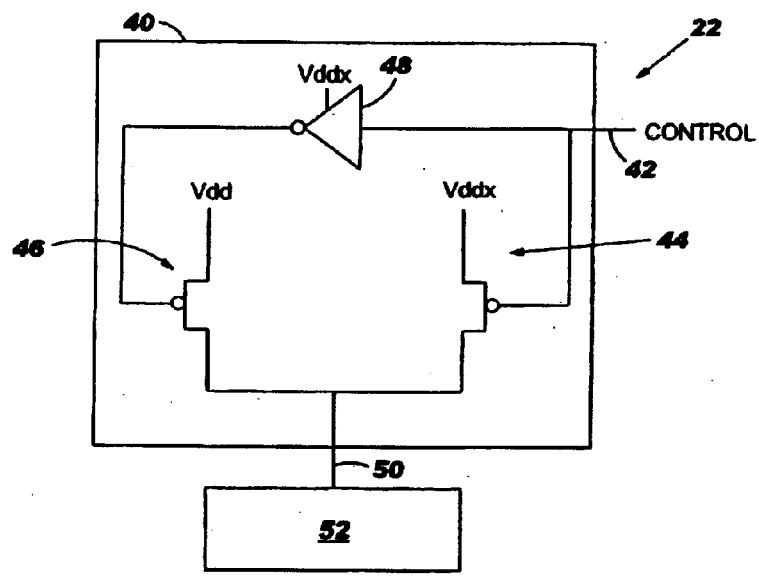
FIG. 3 shows an illustrative control circuit for use with the IC of FIG. 2.

In the embodiment shown in FIG. 2, voltage level changer 30 generates, from the output of voltage level determinator 28, a voltage level control 36 for each stage 22 within critical path 20. In this way, voltage level changer 30 functions to change the voltage level of at least one stage 22 for the particular cycle. Each stage 22 includes a control circuit 40 for deciphering voltage level control 36. Referring to FIG. 3, one illustrative embodiment of control circuit 40 is shown. In this example, control circuit 40 includes: a control input 42 coupled to voltage level changer 30 and receiving voltage level control 36, a first transistor 44 coupled to control input 42 and to a first voltage level (Vddx), a second transistor 46 coupled to control input 42 input via an inverter 4B (operating from the first voltage level), and to a second voltage level (Vdd), and an output 50 coupled to each of first and second transistors 44, 46 and to functional element(s) 52 of the respective stage 22. Each transistor 44, 46 may be, for example, a p-channel FET. The first voltage level (Vddx) is different than the second voltage level (Vdd). In one embodiment, Vddx is higher than Vdd to provide increased performance. However, other embodiments are possible in which Vddx may be any voltage other than Vdd. Referring again to FIG. 2, each stage could have a different value for Vddx enabling multiple stepping up and/or stepping down of voltage values in the path. The following is an example of a double voltage value step up and step down: Vddx of stage 1<Vddx of stage 2<Vddx of stage 3 . . . Vddx of stage n−2>Vddx of stage n−1>Vddx of stage n. Control of Vddx voltage could either be on-chip or off-chip.

In operation, a LOW voltage level control 36 received by control input 42 activates first transistor 44 such that a voltage level supplied to functional element (s) 52 is at a first voltage level (e.g., Vddx). Alternatively, a HIGH voltage level control 36 activates second transistor 46 via inverter 48 such that a voltage level supplied to functional element(s) 52 is at a second voltage level (e.g., Vdd). In this fashion, voltage level control 36 determines which of the first and second voltage levels is delivered to output 50 and functional element(s) 52 within a stage 22. Since each stage 22 receives a control signal 36, individual control of the voltage level of each stage 22 is possible, which provides fine granularity of voltage control from within IC 10. In addition, since both circuit performance and power consumption increase with voltage, both the performance and power consumption will be greater when control input 42 selects a higher voltage level. Thus, varying the value of control input 42 provides a mechanism to change performance and power.

Figure 4:
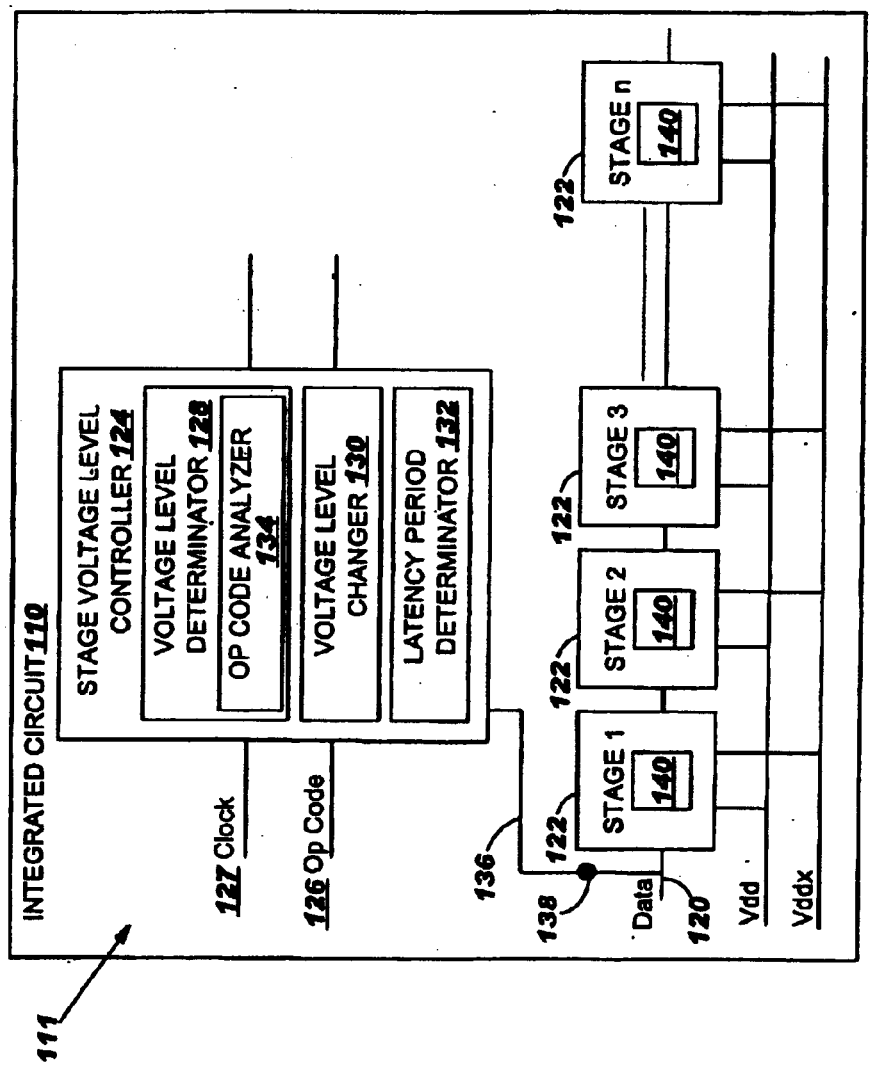
FIG. 4 shows an integrated circuit including dynamic voltage level changing of stages according to a second embodiment.

Referring to FIG. 4, an alternative embodiment of an IC 110 is shown. In this embodiment, IC 110 includes much of the same functional structure as IC 10 (FIG. 2). That is, IC 110 includes a critical path 120 having a plurality of stages 122, and a system 111 for reducing power consumption within its framework including a stage voltage level controller 124 for dynamically changing a voltage level of each stage 122. In addition, IC 110 may include any number of stages 122 denoted stage 1, stage 2, stage 3 and stage n, where n is an integer. As in the first embodiment, stage voltage level adjuster 124 receives operation code ("op code") 126 and clock signal 127, and includes a voltage level determinator 128, a voltage level changer 130 and a latency period determinator 132. Voltage level determinator 128 includes an op code analyzer 134 for analyzing op code 126 to determine a voltage level required for each stage 122 of a particular cycle.

In this embodiment, however, voltage level changer 130 transmits a voltage level control 136 within a data flow on critical path 120. Voltage level control 136 is provided in the form of a bit token 138 for at least one stage 122. Each stage 122 includes a token recognition function 140 for deciphering a respective bit token 138 within the data flow on critical path 120. Token recognition function 140 operates the respective stage's power multiplexor when it's respective bit token 138 is recognized to change between voltage levels. The voltage levels, as before, are different, e.g., Vdd and a higher Vddx. While this embodiment increases circuit complexity over system 11 of FIG. 2, it has the advantage of eliminating the potentially very long global signals required in the previous embodiment.

Figure 5:
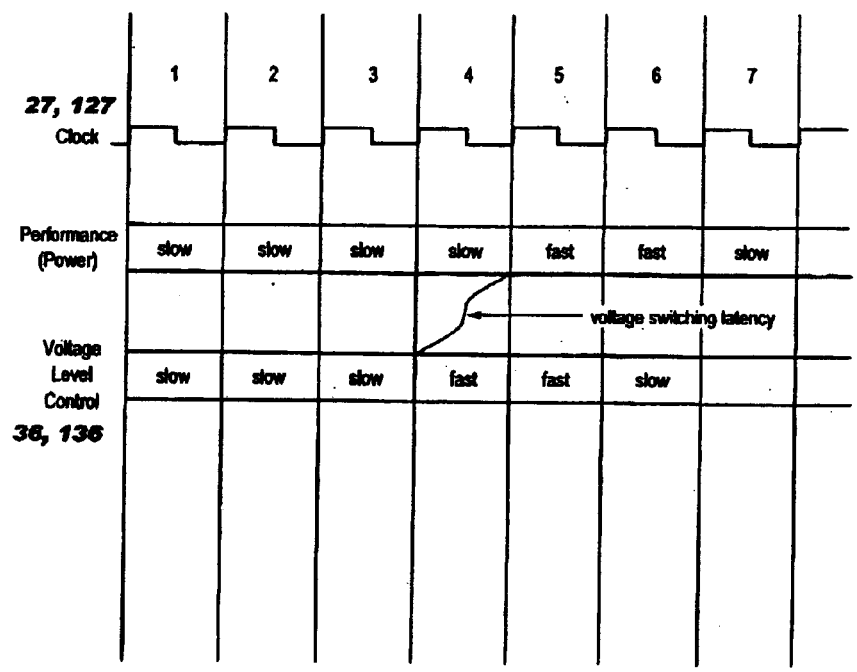
FIG. 5 shows a timing diagram illustrating voltage level shifting latency.

Referring to FIG. 5, one issue requiring addressing is that a particular stage 22, 122 starts to change voltage level as the corresponding voltage level control 36, 136 is passed. Depending on the technology, frequency, and voltage, the time required to power to another voltage level (e.g., a higher voltage level) could exceed the cycle time. This is referred to as "voltage switching latency." In order to address this issue, stage voltage level controller 24, 124 includes a latency period determinator 32, 132 for determining a voltage switch latency period for each stage 22, 122 on a critical path 20, 120 for a particular cycle. The latency period determines a sufficient amount of time (i.e., cycles) prior to the particular cycle for which a different voltage level is required that a voltage level control 36, 136 must be sent to accommodate the voltage switch latency of a respective stage 22, 122. As shown in FIG. S, a voltage switch latency of one cycle is present for a particular stage 22, 122. In this case, voltage level control 36, 136 is changed/transmitted by voltage level changer 30, 130 sufficiently prior to the particular cycle to accommodate the voltage switch latency period of a respective stage. In the example shown in FIG. 5, voltage level control 36, 136 is changed/transmitted (in cycle 4) one cycle prior to when the voltage level switch is required, i.e., cycle 5, for the particular cycle's critical path.

The invention also includes a method of reducing power consumption of an IC 10, 110. The method may comprise the steps of: transmitting data along one of a plurality of paths 12 based on a particular operation to be executed, each path including a plurality of stages 22 that operate on the data; and changing a voltage level of at least one stage 22 on the path. The method may also include the step of determining a required voltage level for each stage, where the determining step includes analyzing an operation code to determine a voltage level required of each stage on a critical path of a particular cycle. Further, the method may include the step of determining a voltage switch latency period for each stage, and changing the voltage level sufficiently prior to the particular cycle to accommodate the voltage switch latency period of a respective stage. This latter changing step may include transmitting a voltage level control as a bit token for the at least one stage with a data flow along the path.

The invention described here facilitates on-chip voltage control for performance and power optimization at a finer grained level than has been available. In addition, the invention allows dynamic voltage control per stage in a critical path without level shifting between stages.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

For example, while the invention has been described with two voltage levels available, it should be recognized that more than two voltage level selections may be provided, and structural and functional accommodations made therefor.

What is claimed is:

1. An integrated circuit comprising:

a plurality of paths including a critical path for a particular cycle, the critical path including a plurality of stages;

means, within the integrated circuit, for dynamically changing a voltage level of least one stage for the particular cycle; and means within the integrated circuit for determining a voltage switch latency period for each stage;

wherein the means for changing the voltage level changes the voltage level sufficiently prior to the particular cycle to accommodate the voltage switch latency period of a respective stage.

2. The integrated circuit of claim 1, wherein the means for dynamically changing the voltage level includes:

means for determining a voltage level required for each stage for the particular cycle; and means for changing the voltage level of the at least one stage for the particular cycle.

3. The integrated circuit of claim 2, wherein the means for determining includes means for analyzing an operation code and determining a voltage level required for each stage.

4. The integrated circuit of claim 2, wherein, the means for changing transmits a voltage level control as a bit token for the at least one stage with a data flow along the critical path.

5. The integrated circuit of claim 2, wherein each stage includes means for deciphering the voltage level control.

6. The integrated circuit of claim 5, wherein the means for deciphering includes control circuit at each stage, each control circuit having:

a control input coupled to the means for changing;

a first transistor coupled to the control input and to a first voltage level;

a second transistor coupled to the control input via an inverter and to a second voltage level;

an output coupled to each of the first and second transistors and to a functional element of the respective stage;

wherein the control input determines which of the first and second voltage levels is delivered to the output; and wherein the first voltage level is different than the second voltage level.

7. A method of reducing power consumption of an integrated circuit comprising:

transmitting data along one of a plurality of paths based on a particular operation to be executed, each path including a plurality of stages that operate on the data;

changing a voltage level of at least one stage; and determining a voltage switch latency period for each stage.

8. The method of claim 7, further comprising the step of determining a required voltage level for each stage.

9. The method of claim 8, wherein the step of determining includes analyzing an operation code to determine a voltage level required of each stage.

10. The method of claim 7, wherein the step of changing the voltage level includes transmitting the voltage level sufficiently prior to the particular cycle to accommodate the voltage switch latency period of a respective stage.

11. The method of claim 7, wherein the step of changing includes transmitting a voltage level control as a bit token for the at least one stage with a data flow along the path.

12. A system for reducing power consumption of an integrated circuit, the system comprising:

means, within the integrated circuit, for determining a voltage level required for each stage on a path used for a particular cycle;

means, within the integrated circuit, for changing the voltage level of at least one stage on the path; and means, within the integrated circuit for determining a voltage switch latency period for each stage;

wherein the means for changing the voltage level changes the voltage level sufficiently prior to the particular cycle to accommodate the voltage switch latency period of a respective stage.

13. The system of claim 12, wherein the means for determining includes means for analyzing an operation code and determining a voltage level required for each stage.

14. The system of claim 12, wherein each stage includes means for deciphering a voltage level control from the means for changing.

15. The system of claim 14, wherein the means for deciphering includes a control circuit at each stage, each control circuit having:

a control input coupled to the means for changing;

a first transistor coupled to the control input and to a first voltage level;

a second transistor coupled to the control input via an inverter and to a second voltage level;

an output coupled to each of the first and second transistors and to a functional element of the respective stage;

wherein the control input determines which of the first and second voltage levels is delivered to the output; and wherein the first voltage level is different than the second voltage level.

16. The system of claim 12, wherein the means for changing the voltage level transmits a voltage level control for at least one stage as a bit token with a data flow along the path.

17. The system of claim 12, wherein the path is one of a plurality of paths used for the particular cycle.

* * * * *